United States Patent
Danielsson Fan et al.

(10) Patent No.: US 11,178,401 B2
(45) Date of Patent: Nov. 16, 2021

(54) METHOD AND BITRATE CONTROLLER FOR CONTROLLING OUTPUT BITRATE OF A VIDEO ENCODER

(71) Applicant: Axis AB, Lund (SE)

(72) Inventors: Xing Danielsson Fan, Lund (SE); Viktor Edpalm, Lund (SE); Alexander Toresson, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 16/863,245

(22) Filed: Apr. 30, 2020

(65) Prior Publication Data

US 2020/0374527 A1 Nov. 26, 2020

(30) Foreign Application Priority Data

May 24, 2019 (EP) .................................... 19176483

(51) Int. Cl.
*H04N 19/146* (2014.01)
*H04N 19/126* (2014.01)
*H04N 19/179* (2014.01)
*H04N 19/196* (2014.01)

(52) U.S. Cl.
CPC ......... *H04N 19/146* (2014.11); *H04N 19/126* (2014.11); *H04N 19/179* (2014.11); *H04N 19/197* (2014.11)

(58) Field of Classification Search
None
See application file for complete search history.

(56) References Cited

U.S. PATENT DOCUMENTS

| | | |
|---|---|---|
| 8,107,537 B2 | 1/2012 | Zhou et al. |
| 2006/0227870 A1 | 10/2006 | Tian et al. |
| 2008/0137735 A1 | 6/2008 | Kamariotis et al. |
| 2011/0142125 A1 | 6/2011 | Tripathi et al. |

(Continued)

FOREIGN PATENT DOCUMENTS

| | | |
|---|---|---|
| CN | 100574427 C | 12/2009 |
| CN | 105847805 A | 8/2016 |

OTHER PUBLICATIONS

Extended European Search Report dated Dec. 16, 2019 for the European Patent Application No. 19176483.6.

*Primary Examiner* — Samuel D Fereja
(74) *Attorney, Agent, or Firm* — Volpe Koenig (57) ABSTRACT

A method of controlling output bitrate of a video encoder encoding a video sequence comprises: setting an allowable average bitrate, gathering encoding data by encoding video during a first time period and for each of a plurality of time intervals, storing a respective output bitrate, and a quantisation parameter used for encoding during the respective time interval. For each time interval, the output bitrate is normalised by calculating a corresponding normalised bitrate estimated for a predetermined nominal quantisation parameter as a function of the output bitrate and the quantisation parameter. An average normalised bitrate is calculated by averaging the normalised bitrates of the plurality of time intervals. A new quantisation parameter is calculated based on a comparison of the average normalised bitrate and the allowable average bitrate. The video sequence is encoded using the new quantisation parameter during a second time period subsequent to the first time period.

15 Claims, 9 Drawing Sheets

(56) References Cited

U.S. PATENT DOCUMENTS

| | | | |
|---|---|---|---|
| 2013/0202031 A1* | 8/2013 | Tripathi | H04N 19/40 375/240.03 |
| 2015/0245050 A1* | 8/2015 | Tourapis | G09G 5/10 375/240.02 |
| 2016/0301931 A1* | 10/2016 | Wen | H04N 19/124 |
| 2017/0041608 A1* | 2/2017 | Yokomizo | H04N 19/124 |
| 2018/0192049 A1 | 7/2018 | Fu et al. | |

* cited by examiner

METHOD AND BITRATE CONTROLLER FOR CONTROLLING OUTPUT BITRATE OF A VIDEO ENCODER

TECHNICAL FIELD

The present invention relates to the field of video encoding, and more particularly to controlling output bitrate of a video encoder.

BACKGROUND

In digital video systems, such as network camera monitoring systems, video sequences are compressed by an encoder before transmission, using various video encoding methods. In many cases, there is a limited bandwidth in a network over which the video sequences are to be transmitted, and therefore a rate controller is often used for controlling the output bitrate of the encoder. There may also be limits on storage capacity requiring control of the number of bits output by the encoder.

Rate controllers may apply one of several bitrate control schemes. They may employ a constant bitrate (CBR), a maximum bitrate (MBR), or a variable bitrate (VBR). CBR means that the encoder will strive to always output the same bitrate, regardless of what happens in the captured scene. If bandwidth is limited, this may lead to low quality images when there is a motion in the scene, but high quality images when the image is static. In a surveillance or monitoring situation, this is generally not useful, as a scene with motion is normally of more interest than a static scene. With MBR, the bitrate is allowed to vary, as long as it does not exceed the bitrate limit set. The problems related to this approach are similar to the ones associated with CBR. If the MBR limit is set too low, images of a scene with motion may be of low quality. However, if the limit is set higher, in order to accommodate the motion, the output bitrate may be unnecessarily high when encoding images of a static scene. VBR may also be referred to as constant quality bitrate, meaning that the quality of the encoded images should be kept constant, but the output bitrate is allowed to vary depending on what is happening in the scene. This approach may lead to high output bitrate when there is motion in the scene. This is particularly problematic if bandwidth is limited, such as when transmitting encoded images over a mobile network. Similarly, it is problematic if storage is limited, such as when storing images on board the camera, e.g., on an SD card. High output bitrates may also be problematic in large systems of cameras if several cameras transmit images of scenes with motion simultaneously.

Another problem in digital video systems is that it is difficult to assess a need for storage capacity. If CBR is used, it is easy to estimate the needed storage capacity by simply multiplying the constant bitrate by a desired retention time. However, with MBR and VBR bitrate varies depending on what happens in the captured scene. The cost of storage is in many cases a significant part of the cost of a digital video system, and therefore system owners have a desire to keep storage capacity down. Still, this comes at a risk of losing recorded video, since the total amount of bits output over the desired retention time may be too large for the available storage capacity when there has been a lot of motion and details in the captured scene.

These problems have been addressed in applicant's pending application EP-3 396 961. Here, bitrate is controlled by setting a long-term bit budget and an instantaneous bit restriction. The long-term bit budget may be set based on available storage capacity, and it is used for determining a first allowable bitrate. The instantaneous bit restriction may be based on, e.g., available bandwidth, and it is used for determining a second allowable bitrate. Output bitrate is controlled based on the first and second allowable bitrates in order to fulfil the long-term bit budget, the first allowable bitrate, and the second allowable bitrate. In the application, it is suggested that historical data may be used as input to the bitrate controller. There remains a need, however, for efficient and reliable ways of taking empirical encoding data into account.

SUMMARY

Providing a method of controlling output bitrate from a video encoder makes it possible to ensure that a bit budget is complied with.

Providing a method of controlling output bitrate of a video encoder enables efficient use of an available bit budget, such that high quality images of interesting events in a monitored scene may be provided, while also ensuring that bitrate is not unnecessarily high during periods of little activity in the monitored scene.

Providing a method of controlling output bitrate of a video encoder makes it possible to take into account knowledge gained from earlier encoding of video sequences.

Providing a bitrate controller for controlling output bitrate of a video encoder encoding a video sequence enables efficient bit usage.

Providing a bitrate controller makes it possible to take advantage of data on previous encodings of video sequences.

According to a first aspect, a method of controlling output bitrate of a video encoder encoding a video sequence, comprises setting an allowable average bitrate, gathering encoding data by encoding video during a first time period and for each of a plurality of time intervals of the first time period, storing a respective output bitrate that was output during the time interval, and a quantisation parameter used for encoding during the respective time interval, for each time interval, normalising the output bitrate by calculating a corresponding normalised bitrate estimated for a predetermined nominal quantisation parameter as a function of the output bitrate and the quantisation parameter used during the respective time interval, calculating an average normalised bitrate over the first time period by averaging the normalised bitrates of the plurality of time intervals, calculating a new quantisation parameter based on a comparison of the average normalised bitrate and the allowable average bitrate, and encoding the video sequence using the new quantisation parameter during a second time period subsequent to the first time period. With such a method, it is possible to control bitrate in an efficient manner, such that the allowable average bitrate may be complied with. It also makes it possible to ensure that bits are wisely spent, such that high quality images may be provided of interesting events in a monitored scene, and such that bitrate is not unnecessarily high when little or nothing is happening in the scene. By studying the output bitrate during time intervals of the first time period, and with knowledge of the quantisation parameters used during those time intervals, it is possible to estimate the bitrate that would have been produced, had the nominal quantisation parameter been used during all of the time intervals. This normalised bitrate in turn makes it possible to calculate the normalised average bitrate for the whole first time period. A new quantisation parameter for use during encoding of a video sequence during a second, subsequent time period can be calculated based on the normalised average bitrate and the allowable average bitrate. Thus, it is possible to calculate a new quantisation parameter that should ensure that the output bitrate during the second time period is kept below the allowable average bitrate. In scenes with cyclic behaviour, such as variations in activity during the day, it may be possible to find a new quantisation parameter that makes it possible to comply with the allowable average bitrate once data on a long enough first time period to capture the cyclic behaviour has been stored. Output bitrate may be allowed to surpass the allowable average bitrate for parts of the second time period, as long as the overshoot is compensated for by periods of lower output bitrate. The allowable average bitrate may, e.g., reflect an available storage capacity. The allowable average bitrate may be calculated as the available storage capacity divided by a required retention time, and may be expressed, e.g., in bits per second or bits per hour. The required retention time may, for instance, be 60 days. The allowable average bitrate may be set with a margin, such that it reflects, e.g., 90% of the available storage capacity, thus allowing for unexpected events producing higher output bitrate.

In some variants of the method, the method further comprises comparing the average normalised bitrate to the allowable average bitrate. Upon the average normalised bitrate being above the allowable average bitrate a new quantisation parameter is calculated which is higher than the nominal quantisation parameter, and upon the average normalised bitrate being below or equal to the allowable average bitrate, a new quantisation parameter is calculated which is lower than or equal to the nominal quantisation parameter. Hereby, encoding during the second time period may be adapted, such that the allowable average bitrate is complied with over time. A required retention time may thereby be fulfilled.

When the average normalised bitrate is above a maximum average bitrate, a maximum bitrate control may be applied, and when the average normalised bitrate is below or equal to the maximum average bitrate, a variable bitrate control may be applied. This is a practical way of ensuring that the allowable average bitrate is complied with, which in turn makes it possible to ensure a required retention time. The maximum average bitrate may be calculated as the available storage capacity divided by the required retention time. In other words, the maximum average bitrate may be said to be the allowable average bitrate without margin.

Alternatively, a maximum bitrate control may be used regardless of whether the average normalised bitrate is above or below the maximum average bitrate, but the bitrate limit may be set low when the average normalised bitrate is above the maximum average bitrate and it may be set high when the average normalised bitrate is below or equal to the maximum bitrate. The bitrate limit may be set as the margin to the maximum average bitrate divided by the length of the second time period.

In some variants of the method, gathering encoding data further comprises, for each time interval, storing data on at least one known bitrate increasing disturbance factor. This makes it possible to take into account occurrences of events during the first time period that are known to increase bitrate, such that the calculation of the new quantisation parameter may be adapted. The disturbance factor may be any factor that increases output bitrate without providing any useful or interesting information on the events in the scene. The data on the at least one known bitrate increasing disturbance factor need not be stored per se, but could be used for influencing the stored quantisation parameter.

The disturbance factor may be a signal-to-noise ratio, SNR, of the video encoded during the respective time interval. The method may further comprise, upon the SNR being below a first SNR threshold, offsetting the quantisation parameter used during the time interval by an SNR offset value, such that a lower quantisation parameter is used for the respective time interval in calculating the average normalised bitrate. If there is much noise in the video, i.e. if SNR is low, output bitrate from the encoder will rise, even though there is nothing of additional interest happening in the scene. By offsetting the quantisation parameter used during time intervals with low SNR, the effect of the noise may be compensated for in the calculation of the new quantisation parameter. For instance, if one or more time intervals of the first time period were during low light conditions, such as at dusk or dawn, it is known that there will generally be a high level of noise in the images captured during those time intervals. The noise does not contribute to the understanding of the events in the scene, but increases the number of bits needed for representing the images, because it reduces the temporal redundancy between image frames. In other words, noise adds to output bitrate from the encoder without adding forensic value. If the noise during those time intervals is allowed to affect decisions on how to encode video during subsequent time periods, such as the second time period, the video may be unnecessarily heavily compressed, using a high quantization parameter, particularly if images during those subsequent time periods are not as noisy.

In the context of image sensor data, noise is image sensor data that represents something that was not present in the captured scene. Noise may be temporal, i.e., varying from one image frame to the next, or spatial, i.e. differing from one pixel to another within the same frame. There are various sources of noise. Temporal noise may, e.g., be reset noise, thermal noise, flicker noise, dark current shot noise, quantisation noise or phase noise. Spatial noise may, e.g., be dark fixed-pattern noise, light fixed-pattern noise, leaker noise, defect pixel noise or cosmetic defect noise.

The disturbance factor may be a pan/tilt/zoom, PTZ, movement during the respective time interval. The method may further comprise, upon the PTZ movement being above a first PTZ threshold, offsetting the quantisation parameter used during the time interval by a PTZ offset value, such that a lower quantisation parameter is used for the respective time interval in calculating the average normalised bitrate. Similar to noise, camera movement adds to output bitrate without adding much in the way of forensic value. It is therefore useful to be able to reduce the impact of this bitrate increase by offsetting the quantisation parameter when calculating the average normalised bitrate.

Instead of offsetting the quantisation parameter when there is a high degree of disturbance, it would also be possible to offset the quantisation parameter in the opposite direction when there is a sufficiently low degree of disturbance.

In some variants of the method, the quantisation parameter, the nominal quantisation parameter, and the new quantisation parameter are each a representative quantisation parameter representative of one or more quantisation parameters. In this manner, different quantisation parameters may be used in different parts of each image frame. The quantisation parameter for a portion of the image frame, or for a particular macroblock, may be decreased or increased compared to the representative quantisation. For instance, the decrease or increase may be based on whether the portion or macroblock is deemed to be in a relevant or not relevant part of the image frame. An encoding method using such a division of the image frame into relevant and not relevant parts is disclosed in applicant's pending application EP-3 021 583.

The method may further comprise during the second time period gathering encoding data by encoding video during the second time period and for each of a plurality of time intervals of the second time period, on a first-in-first-out basis, storing a respective output bitrate that was output during the time interval, and a quantisation parameter used for encoding during the respective time interval. A sliding window approach may be used, where as soon as data on a sufficiently long time period has been obtained, the stored data is used for determining the new quantisation parameter to be used in the upcoming time interval. The output bitrate and quantisation parameter of that time interval is then added to the knowledge base, and the oldest data, corresponding to an equally long time interval, is discarded.

The method may be repeated at a plurality time points, and wherein the first time period corresponds to a sliding time window which for each time point covers a time range of fixed duration before that time point.

The normalised bitrate may be calculated using a predetermined relation specifying how a change in quantisation parameter affects output bitrate. By using knowledge of how changes in quantisation parameter influence output bitrate the normalised bitrate can be calculated or estimated without having to re-encode the video sequence with the nominal quantisation parameter.

In some variants of the method, the new quantisation parameter is calculated using a predetermined relation specifying how a change in quantisation parameter affects output bitrate. Similar to the calculation of the normalised bitrate, knowledge of the relationship between changes in quantisation parameter and output bitrate enables calculation or estimation of the new quantisation parameter, without a need for test encoding the video sequence of the second time period with a set of different test quantisation parameters.

According to a second aspect, a bitrate controller for controls output bitrate of a video encoder encoding a video sequence, the bitrate controller comprising a bitrate presetter configured to set an allowable average bitrate, a data storage configured to store encoding data from encoding video during a first time period, for each of a plurality of time intervals of the first time period storing a respective output bitrate that was output during the time interval, and a quantisation parameter used for encoding during the respective time interval, an output bitrate normaliser configured to, for each time interval, normalise the output bitrate by calculating a corresponding normalised bitrate estimated for a predetermined nominal quantisation parameter as a function of the output bitrate and the quantisation parameter used during the respective time interval, an average bitrate calculator configured to calculate an average normalised bitrate over the first time period as a function of the quantisation parameter used during the respective time interval, a quantisation parameter calculator configured to calculate a new quantisation parameter based on a comparison of the average normalised bitrate and the allowable average bitrate, and a control output configured to output the new quantisation parameter to the video encoder for encoding the video sequence during a second time period subsequent to the first time period. Such a bitrate controller makes it possible to use knowledge of the outcome of earlier encoding for setting a suitable quantisation parameter for encoding during a subsequent time period. It enables ensuring that a required retention time is maintained, while also enabling efficient use of the available storage capacity.

The bitrate controller of the second aspect may be embodied in essentially the same ways as the bitrate control method of the first aspect, with accompanying advantages.

According to a third aspect, a computer program product comprises a non-transitory computer-readable storage medium with instructions adapted to carry out the method according to the first aspect.

According to a fourth aspect, a camera comprises a bitrate controller according to the second aspect.

According to a fifth aspect, a network video recorder comprises a bitrate controller according to the second aspect.

A further scope of applicability of the present teachings will become apparent from the detailed description given below. However, it should be understood that the detailed description and specific examples, while indicating preferred embodiments, are given by way of illustration only, since various changes and modifications will become apparent to those skilled in the art from this detailed description.

Hence, it is to be understood that this teachings are not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, a reference to "an object" or "the object" may include several objects, and the like. Furthermore, the word "comprising" does not exclude other elements or steps.

BRIEF DESCRIPTION OF THE DRAWINGS

The teachings will now be described in more detail by way of example and with reference to the accompanying schematic drawings, in which.

It should be noted that the scale in the graphs in FIGS. 3, 5, and 6 is arbitrary. It does not indicate any real values and does not indicate relative sizes between the plotted parameters. The scale is only used for indicating variations of each plotted parameter.

DETAILED DESCRIPTION OF EMBODIMENTS

Figure 1:
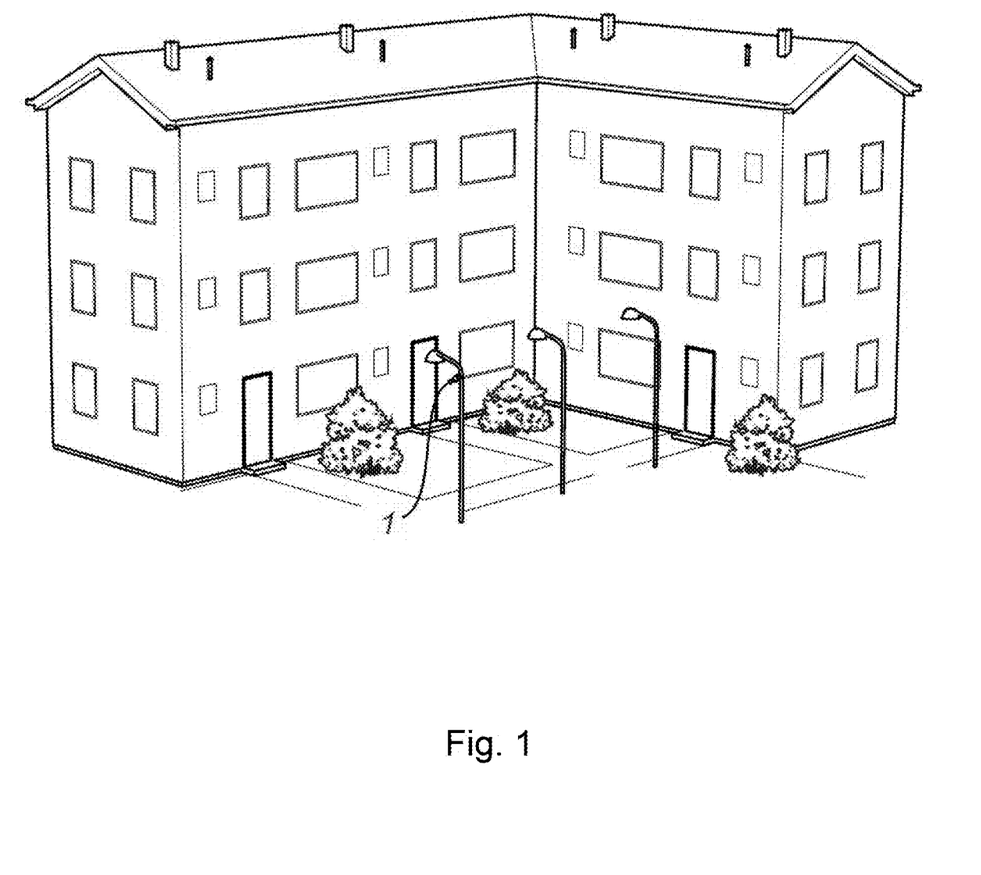
FIG. 1 shows a scene monitored by a camera.

In FIG. 1, a scene is shown, which is monitored by a camera 1. Video captured by the camera is recorded. This may be done continuously, although it will in many cases be preferable to record based on event triggers or based on a schedule in order to reduce the amount of uninteresting video recorded.

Storage of the recorded video may be done on the camera 1, e.g., on an SD card. If the camera 1 is part of a camera system, such as the camera system 20 shown in FIG. 2, alternatively or additionally, storage may be done remote from the camera, such as in a network video recorder 21. The network video recorder 21 may be located in a control centre 22, where an operator may watch recorded video as well as live-streamed video on a user station 23. A network 24 connects the cameras 1, the network recorder 21 and the user station 23. The network video recorder 21 may instead be located separate from the control centre 22, and may for example be a cloud service.

Figure 2:
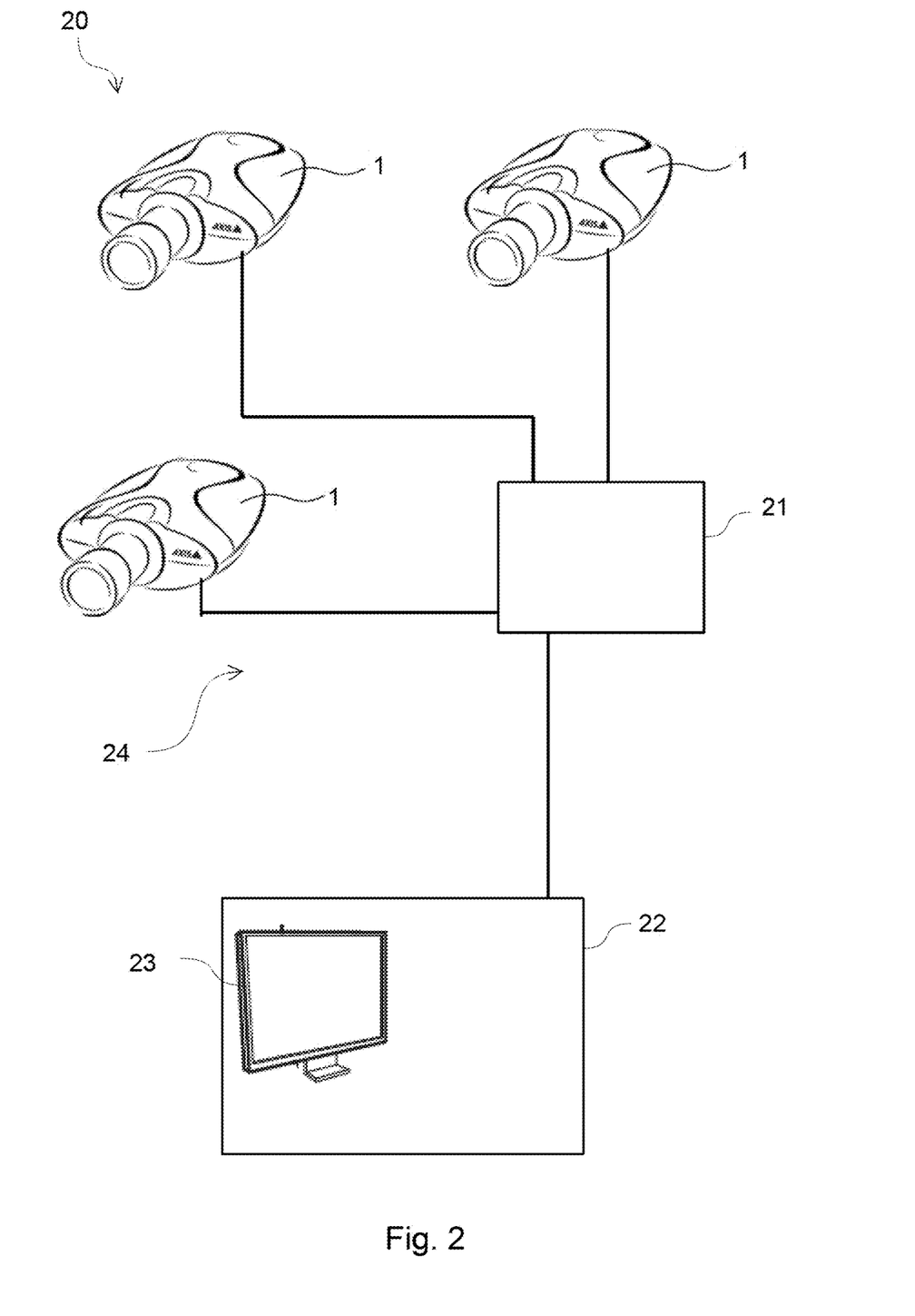
FIG. 2 is a diagram of a camera system.

In many situations, the recorded video needs to be stored during a required retention time. For instance, if a crime is reported, it may be necessary to go back to video recordings from a time around the time of the crime for investigating what happened in the monitored scene. The retention time needs to be long enough that the needed video data has not already been over-written when the investigator needs the video data. It may therefore be necessary to guarantee a retention time of, e.g., 30 or 60 days. In order to meet that requirement, bitrate control is necessary. In other words, the amount of video data produced by an encoder in the camera needs to be controlled, such that the amount of data produced during the required retention does not exceed the capacity of the available storage, but that on an SD card in the camera 1 or in a network video recorder. It may be noted that bitrate control is usually necessary also for limiting output bitrate in order to ensure that output bitrate from the camera 1 is below the bandwidth of the network 24, such that transmission of video from the camera 1 to, e.g., the control centre 22 can be ensured.

One way of solving the problem would be to use a constant bitrate, CBR, control scheme. However, this would reduce image quality at the times when the recorded video is most likely to be of interest, namely when there is a lot of movement in the scene. As noted in the background section of the present application, this problem has been dealt with in applicant's pending application EP-3 396 961, in a way that also enables more efficient usage of the allowable number of bits. In that application, output bitrate from an encoder is controlled using two bitrate limits. One of these bitrate limits may be based on available bandwidth, such that the encoded video can be safely transmitted to where it is to be viewed or stored. The other bitrate limit may be based on available storage capacity and required retention time. There are, however, still challenges in finding suitable parameters for the encoding in order to ensure retention time, stay within the available bandwidth, and provide high quality images of interesting events while not spending unnecessary bits on uninteresting portions of video. Ways of meeting these challenges will be described in the following, by way of examples and embodiments.

Figure 4:
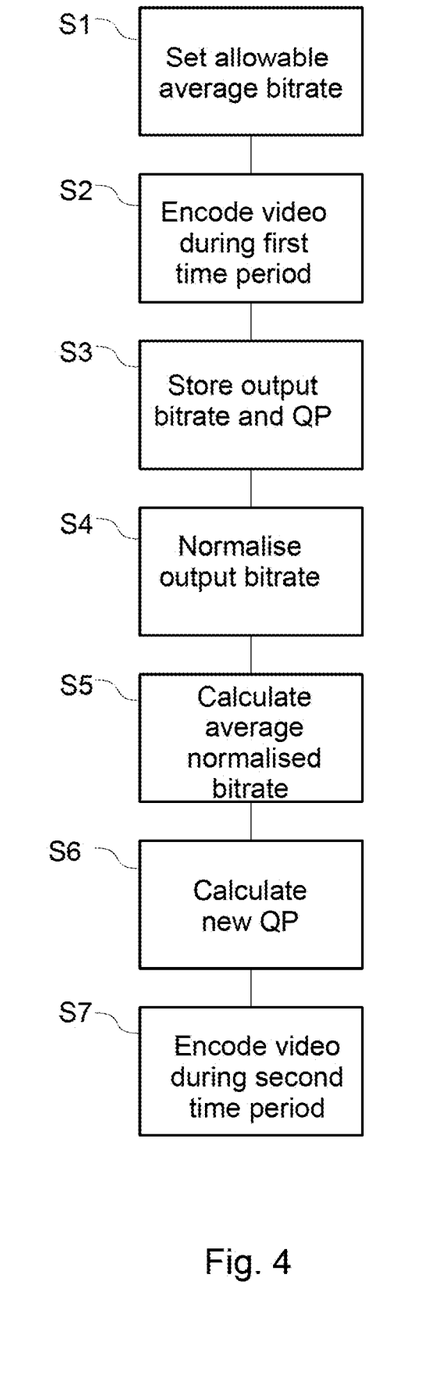
FIG. 4 is a flow chart illustrating a variant of the method.

Reference may now be made to FIG. 4, which is a flow chart showing the steps of an example of the method. An allowable average bitrate is set in step S1. The allowable average bitrate $BR_{avg}$ may be calculated as the available storage capacity divided by the required retention time. It may for instance be expressed as a number megabytes per day or a number of megabits per second. The allowable average bitrate may advantageously be set with a margin, $BR_{avg, marg}$, such that rather than the whole storage capacity, it is based on, e.g., 90% of the storage capacity. In this manner, unexpected events leading to increases in output bitrate that are difficult or impossible to compensate for, even using the approach described in the following, may be accommodated. The average bitrate calculated without margin will in the following be referred to as a maximum average bitrate $BR_{avg, max}$.

Figure 3:
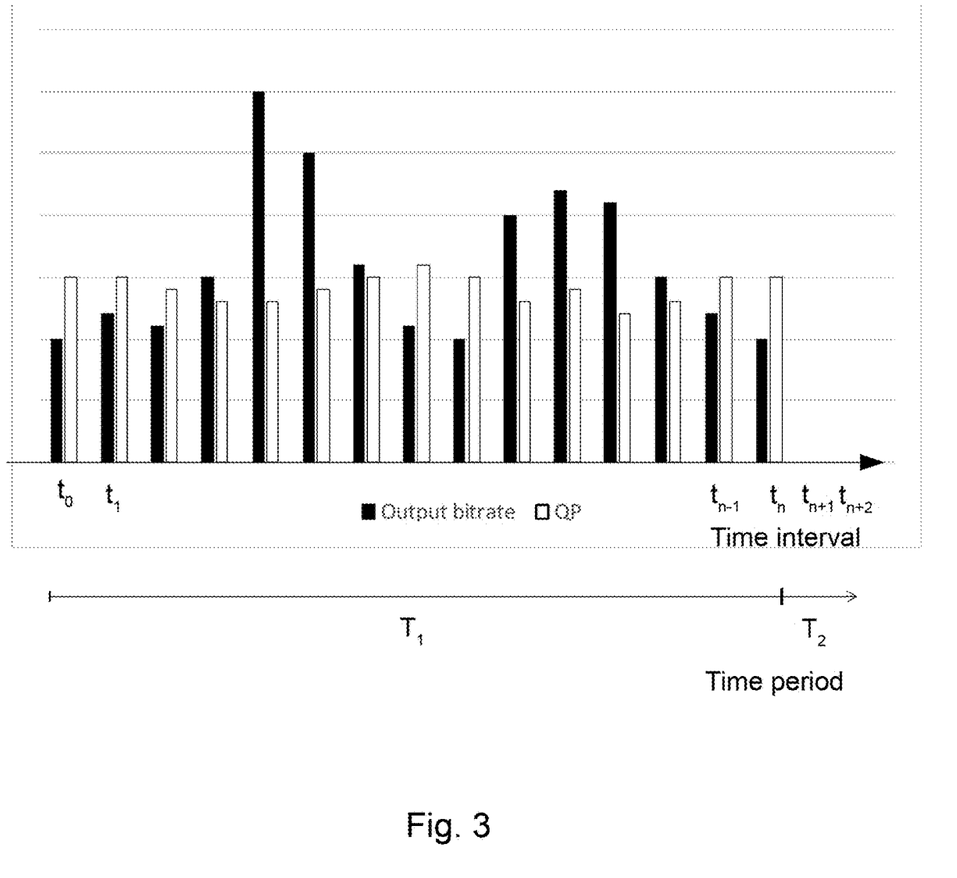
FIG. 3 is a graph showing quantisation parameter used and output bitrate produced by a video encoder during a first time period.

Video is captured and encoded by the camera 1 (step S2). As shown in FIG. 3, data on the video encoding during a first time period $T_1$ is stored. The first time period $T_1$ is divided into a plurality of time intervals $t_0, t_1, \ldots, t_{n-1}, t_n$, and for each time interval, the output bitrate (or the number of output bits) from the encoder during that time interval is stored, as well as the quantisation parameter, QP, used during the time interval (step S3). As may be seen in the example in FIG. 3, output bitrate and quantisation parameters vary during the first time period $T_1$.

In order to make the output bitrate data of the different time intervals useful for making decisions on how to control bitrate when encoding video during a second, subsequent time period $T_2$, the output bitrate of each time interval is normalised in step S4. This means that a normalised bitrate $BR_{norm}$ is calculated, which would have been output from the encoder had a nominal quantisation parameter $QP_{nom}$ been used during each time interval. This normalisation of the output bitrate is performed using a predetermined relationship between changes in quantisation parameter and accompanying changes in output bitrate. The relationship may be determined empirically, by encoding the same video sequence using a plurality of different quantisation parameters. The relationship may be known depending on which encoder is used. For instance, the following formula may be used for calculating the normalised bitrate:

$$BR_{norm} = BR_x \cdot e^{\frac{QP_x - QP_{nom}}{6}}$$

wherein $BR_{norm}$ is the normalised bitrate, $BR_x$ is the output bitrate recorded during time interval x, $QP_x$ is the quantisation parameter used during the same time interval, and $QP_{nom}$ is the nominal quantisation parameter.

With some encoders, the formula may more generally be expressed as:

$$BR_{norm} = BR_x \cdot C^{\frac{QP_x - QP_{nom}}{6}}$$

where C takes a value between 2 and Euler's number e depending on which encoder is used.

The nominal quantisation parameter $QP_{nom}$ advantageously takes a value close to what is expected to be an average quantisation parameter over time, and may for example take the value 29 on a QP scale of 0-51 in an embodiment using H.264, where 0 represents a low compression, leading to high image quality by using small quantisation steps, and 51 represents high compression, leading to low image quality by using large quantisation steps.

In step S5, an average normalised bitrate is calculated by multiplying the normalised bitrate of each of the time intervals by the length of the respective time interval, summing the thus calculated bit numbers, and dividing the sum by the length of the first time period, i.e. dividing the sum of the normalised bitrates by the number of time intervals if the time intervals are all of the same length.

A new quantisation parameter $QP_{new}$ for use when encoding video during a second time period $T_2$, which is subsequent to the first time period $T_1$, may now be calculated in step S6. As when calculating the normalised bitrate, the new quantisation parameter is calculated based on the predetermined relationship between changes in in quantisation parameter and accompanying changes in output bitrate. The new quantisation parameter $QP_{new}$ is calculated based on a comparison of the normalised average bitrate $BR_{norm,\ avg}$ and the allowable average bitrate $BR_{avg,marg}$. Thus, the new quantisation parameter may be calculated using the following formula:

$$QP_{new} = QP_{nom} + 6 \cdot \ln\left(\frac{BR_{norm,avg}}{BR_{avg,marg}}\right)$$

It should be noted that the base of the logarithm will depend on the encoder, and will, again, generally be between 2 and e.

If the normalised average bitrate is above the allowable average bitrate too many bits have been output during the first time period for the required retention time to be met, should the output bitrate in subsequent time periods be as high as during the first time period. In this situation, a new quantisation parameter $QP_{new}$ will be calculated which is higher than the nominal quantisation parameter $QP_{nom}$. In other words, video will be more compressed during the second time period than if the nominal quantisation parameter were used. If, on the other hand, the normalised average bitrate is below or equal to the allowable average bitrate, there should be room for higher image quality while still meeting the required retention time. In this situation, a new quantisation parameter $QP_{new}$ will be calculated which is lower than or equal to the nominal quantisation parameter $QP_{nom}$.

The length of the second time period may be equal to the length of a time interval $t_x$ of the first time period $T_1$. For ease of calculations, each time interval $t_x$ of the first time period $T_1$ is preferably of the same length. However, as long as the length of each time interval is known, varying length is possible.

When finding a new quantisation parameter $QP_{n+1}$ to use when encoding video during the upcoming time interval $t_{n+1}$, the data on output bitrate and quantisation parameters used during a number of preceding time intervals $t_x$ will be used for the calculations. When the method is initialised, there will at first not be any data, and the quantisation parameter to use will have to be determined some other way, e.g., set as a default value in the encoder. After a few time intervals, there is some data, such that the method can start to be used, but the result may not be very accurate. Depending on events in the scene, the quantisation parameter may at first change quite erratically. After an initialising period, there will be data from a sufficient number of time intervals to be able to make good use of them for determining a new quantisation parameter to use during an upcoming time interval. The length of the initialising period may depend on how stable or cyclic events in the scene are. For instance, outside an office building, there may be a daily pattern with lots of activity in the early morning when people come to work, less activity during the morning, some activity again when people go out to and back from lunch, less activity during the afternoon, and then lots of activity again at the end of the working day. During the night there may be very little activity. This pattern may repeat on a daily basis, making data from one day useful for finding suitable quantisation parameters for use during a subsequent day.

Once there is data from a sufficient number of time intervals, or in other words from a sufficiently long first time period, data from the oldest time interval can be discarded when data from the latest time interval is stored, on a first-in-first-out basis, such that data on a constant number of time intervals is always retained.

At a point in time when the new quantisation parameter $QP_{n+1}$ for encoding video during the subsequent second time period $T_2$, which in this example is the upcoming time interval $t_{n+1}$, is to be calculated, data from a plurality of preceding time intervals are used. In this example, the data from the time intervals $t_0$-$t_n$, i.e. the first time period $T_1$ as shown in FIG. 3, will be used. Thus, as described above in relation to FIG. 4, an allowable average bitrate has been set. This can be done once during installation and configuration of the bitrate controller and needs to be changed only if the available storage capacity or required retention time is changed. Video has been encoded during the first time period $T_1$ and data on output bitrate and quantisation parameter have been stored for each time interval $t_0$-$t_n$. The bitrate of each time interval is normalised as discussed above in connection with step S4 and the average normalised bitrate is calculated for the first time period $T_1$. The new quantisation parameter for use when encoding video during the upcoming time interval $t_{n+1}$ is calculated as discussed in relation step S6. The encoder then encodes the video during the upcoming time interval $t_{n+1}$ using the new quantisation parameter $QP_{n+1}$.

This is repeated, such that the quantisation parameter $QP_{n+1}$ used during the latest time interval $t_{n+1}$ is stored, as is the output bitrate $BR_{n+1}$ produced by the encoder during that time interval $t_{n+1}$. The data from the oldest time interval, in this case $t_0$, is discarded. In this manner, data from the same amount of time remains in storage, although the time frame has been shifted forward corresponding to the length of one time interval. Thus, the first time period, for which there is data on earlier encoding remains of fixed duration, but is shifted according to a sliding window principle.

Again, after the video of the latest time interval $t_{n+1}$ has been encoded, when a new quantisation parameter $QP_{n+2}$ for use during the next time interval $t_{n+2}$ is to be calculated, the sliding window technique means that data from the preceding time intervals $t_1$-$t_{n+1}$ will be used. These calculations are performed in the same way as described above. When video of this latest time interval $t_{n+2}$ has been encoded, the quantisation parameter $QP_{n+2}$ and the resulting output bitrate $BR_{n+2}$ are stored and the data of the oldest time interval $t_1$ is discarded. Repeating this process, data on quantisation parameter and output bitrate for each time interval of a preceding first time period of fixed duration is used every time a new quantisation parameter is to be found for encoding video during a subsequent second time period. As noted above, the length of the second time period $T_2$ may advantageously be equal to the length of a respective time interval $t_x$ of the first time period $T_1$.

As noted above, the calculation of the new quantisation parameter is based on a comparison of the normalised average bitrate and the allowable average bitrate. A comparison of the normalised average bitrate and the maximum average bitrate may also be used for determining which bit rate control scheme should be used. If a comparison of the normalised average bitrate and the maximum average bitrate finds that the average normalised bitrate is above the maximum average bitrate, a maximum bitrate control, MBR, may be applied in order to ensure that the required retention time is met. If, instead, the normalised average bitrate is below or equal to the allowable average bitrate, a variable bitrate control, VBR, may be applied, such that a constant image quality may be obtained, rather than a constant output bitrate. As noted above, it would also be possible to apply an MBR at all times, but with different bitrate limits depending on the outcome of the comparison of the normalised average bitrate and the maximum average bitrate.

The method described above may be supplemented to take into account that not all bitrate increases are of any real forensic value. For instance, it is well known that noise in the captured images tend to increase output bitrate from the encoder. If the noise is temporal, redundancy between image frames decreases, such that more bits are needed for representing changes between frames, even though the noise is not of interest to the viewer of the video, and thus adds no forensic value. Similarly, relative movement between scene and camera generally increase output bitrate from the encoder, but not all such movement is of interest to the viewer. Actual movement or changes in the scene are usually of more interest than apparent movement caused by movement of the camera. Naturally, pan, tilt, and zoom operations, also referred to as PTZ movements, are of value to the viewer of the captured video, as they make it possible to see parts of a scene that might not otherwise be visible, but the bitrate increase caused during the movement does not in itself add much in the way of useful information.

If such bitrate increasing disturbance factors have occurred during some of the time intervals $t_x$ of the first time period $T_1$, the output bitrate increase in those time intervals will not add forensic value, but will add to the normalised average bitrate. This will in return lead to an increase of the new quantisation parameter $QP_{new}$ calculated based on that normalised average bitrate. If the bitrate increasing disturbance factor was just a temporary occurrence, that is not expected to occur again during the second time period $T_2$, the new quantisation parameter $QP_{new}$ for use during the second time period may be unnecessarily high, leading to suboptimal image quality during the second time period. In order to avoid that such bitrate increasing disturbance factors, such as noise or camera movement, negatively impact image quality during the second time period, data on such known bitrate increasing disturbance factors may be stored for each time interval of the first time period.

Figure 5:
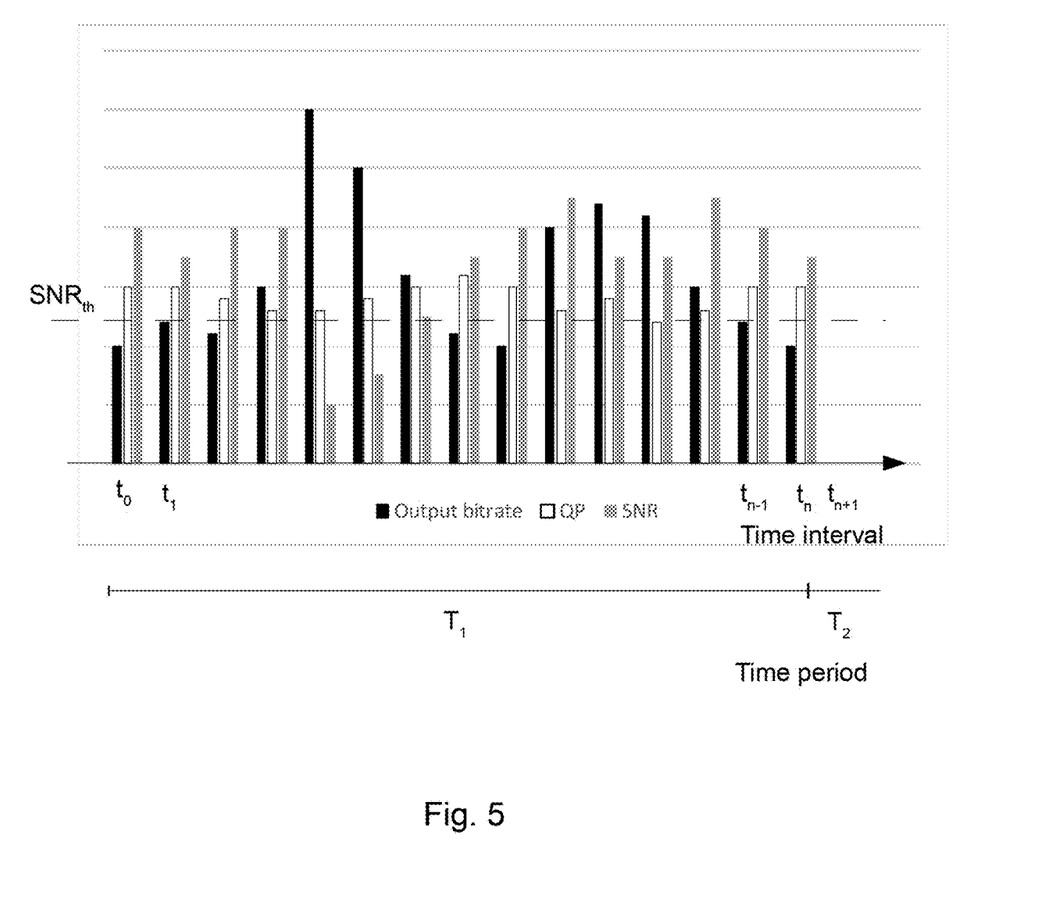
FIG. 5 is a graph showing SNR measured during the first time period.
Figure 6:
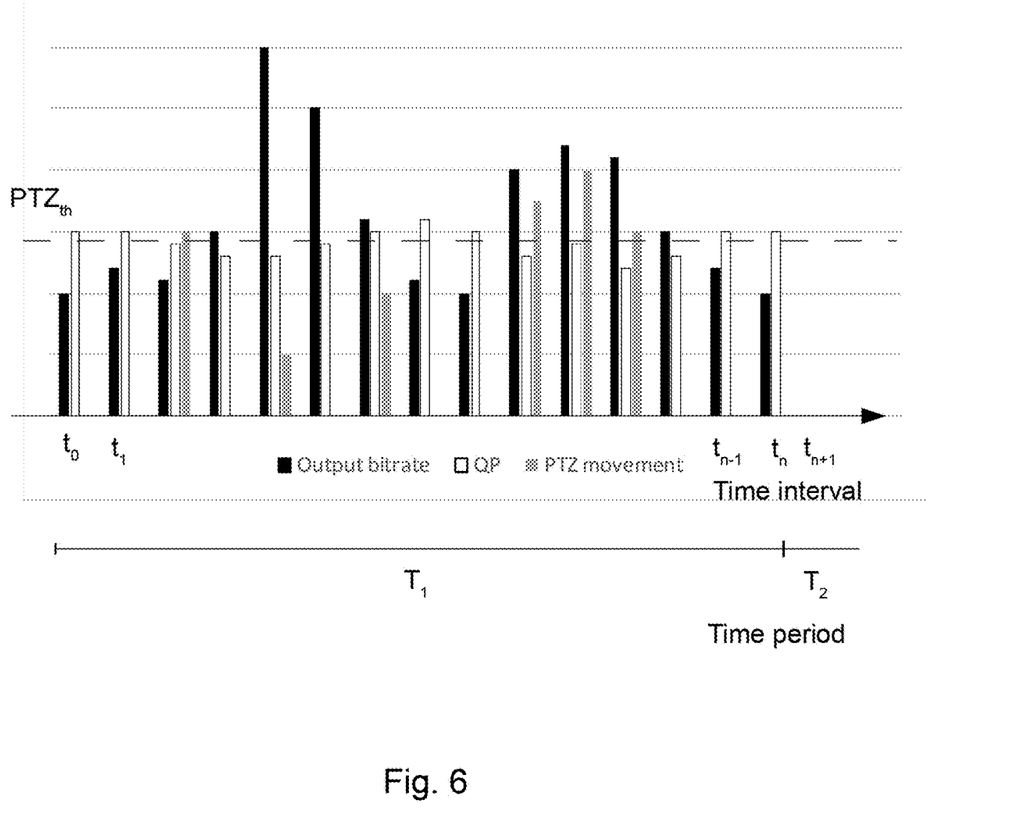
FIG. 6 is a graph showing PTZ movements registered during the first time period.

In FIG. 5, an example is shown, where data on SNR have been stored for each time interval, along with the data on quantisation parameter and output bitrate. In FIG. 6, a similar example is shown, in which data on PTZ movements have been stored.

Figure 7:
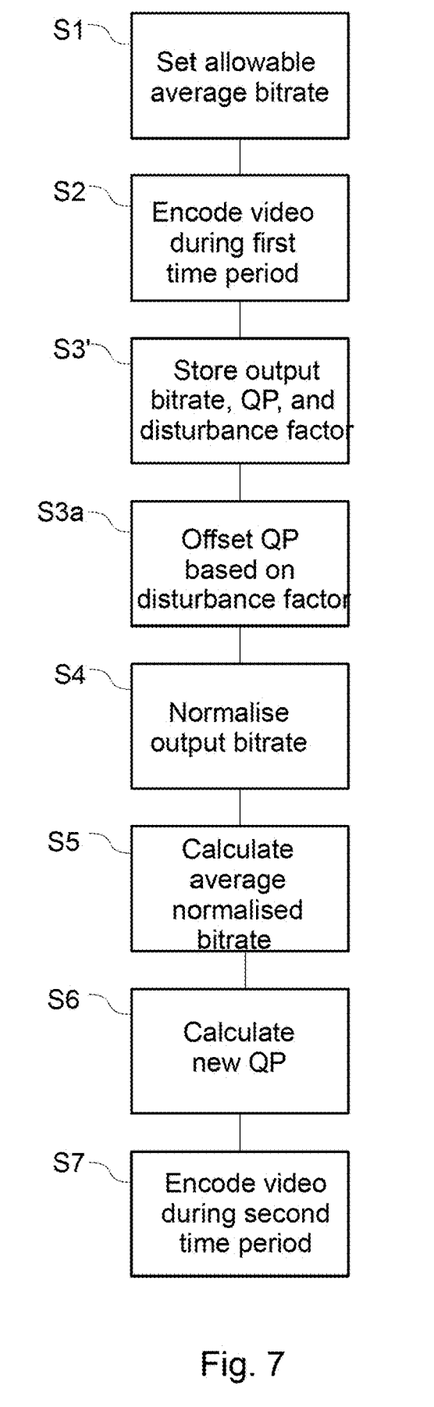
FIG. 7 is a flow chart showing another variant of the method.

With reference to FIG. 7, a variant method will now be described, in which known bitrate increasing disturbance factors are accounted for.

In the same way as described in connection with FIG. 4, an allowable average bitrate is set in step S1, and video is encoded during a first time period in step S2. Step S3' is modified relative to step S3 in FIG. 4 in that data on at least one known bitrate increasing disturbance factor is stored for each time interval of the first time period, in addition to the data on output bitrate and quantisation parameter. A step S3a is added, in which the quantisation parameter used in the respective time intervals is offset depending on the data on the bitrate increasing disturbance factor. The quantisation parameter used during a time interval is artificially lowered before use in the calculation of the new quantisation parameter if the bitrate increasing disturbance is deemed significant enough to otherwise disturb the calculation of the new quantisation parameter. In this way, the influence of the bitrate increasing disturbance factor can be reduced or even eliminated.

Looking at the example of noise, expressed as SNR, if the SNR in a time interval is below a first SNR threshold, illustrated by a dotted line $SNR_{th}$ in the graph in FIG. 5, the quantisation parameter used during that time interval is offset by an SNR offset value, such that a lower quantisation parameter is used in the calculation of the normalised average bitrate, e.g. one step or part of a step lower quantisation parameter. Hereby, the calculation of the new quantisation parameter is "tricked" into assuming that part of the output bitrate during the noise-affected time interval was caused by a lower quantisation parameter.

With reference to FIG. 6, looking at the example of camera movement, referred to as PTZ movement, if the PTZ movement in a time interval is above a first PTZ threshold $PTZ_{th}$, the quantisation parameter used during that time interval is offset by a PTZ offset value, such that a lower quantisation parameter is used in the calculation of the normalised average bitrate. Thus, the calculation of the new quantisation parameter will be based on the artificial assumption that part of the bitrate output by the encoder during that time interval was caused by a lower quantisation parameter. The PTZ movement may, e.g., be expressed in terms of speed of a panning or tilting movement, or as a zoom factor.

Possibly, more than one threshold can be set for one or more disturbance factors. For instance, if the SNR during a time interval is below the first SNR threshold, the quantisation parameter used during that time interval may be offset by a first SNR offset value, such that a quantisation parameter that is one step or part of a step lower than the actual quantisation parameter is used for the calculation of the normalised average bitrate. If there is even more noise, such that the SNR is also below a second SNR threshold, which is lower than the first SNR threshold, the quantisation parameter used during that time interval may be offset by a second SNR offset value which offsets the quantisation more than the first SNR offset value, e.g. one or more steps.

It should be noted that the disturbance factors, such as noise and PTZ movement, need not be stored as such. They may instead be stored indirectly, by influencing the quantisation parameter that is stored for the respective time interval, such that the quantisation parameter is stored with an offset.

Furthermore, as noted above, an opposite offset may instead be applied when there is little or no disturbance.

Figure 8:
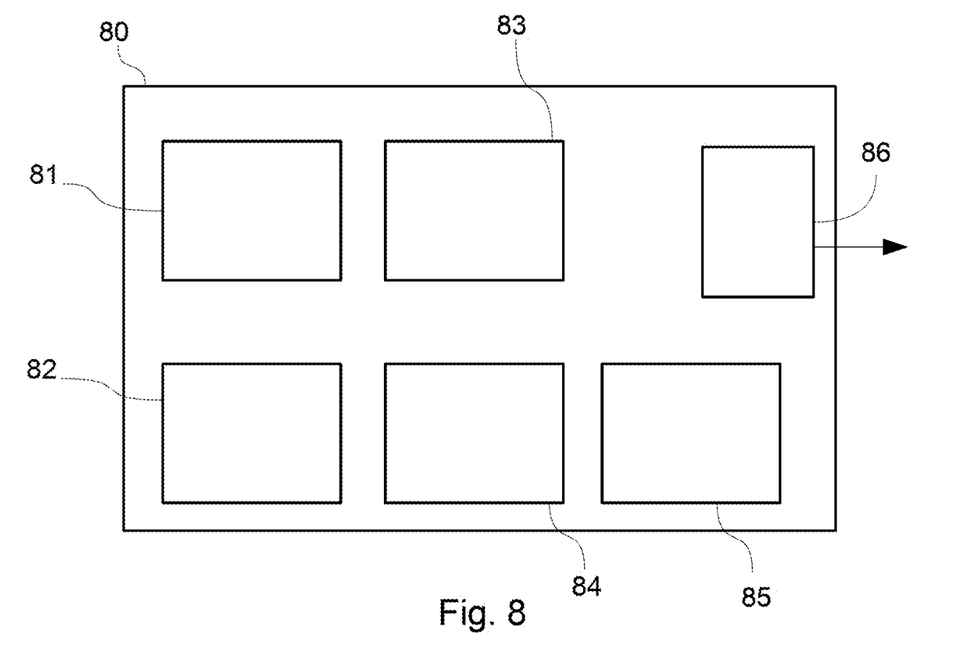
FIG. 8 is a block diagram of an embodiment of a bitrate controller.

The method may be performed in a bitrate controller 80 such as the one schematically shown in FIG. 8. The various modules or parts of the bitrate controller described in the following may be implemented in hardware or in software, or any combination thereof. Thus, some or all of the modules may be in the form of circuitry configured to perform one or more of the functions described in the following. Additionally or alternatively, the bitrate controller may comprise non-transitory computer readable media and a processor for storing and executing instructions for performing one or more of the functions.

The bitrate controller 80 has a bitrate presetter 81, which is configured to set the allowable average bitrate. The bitrate controller also has a data storage 82 configured to store encoding data from encoding during the first time period $T_1$. For each time interval in the first time period, the data storage should store the respective output bitrate that was output during the time interval, and the quantisation parameter used during the time interval.

Further, the bitrate controller 80 has an output bitrate normaliser 83, which is configured to normalise the output bitrate for each time interval by calculating the corresponding normalised bitrate estimated for the predetermined nominal quantisation parameter as a function of the output bitrate and the quantisation parameter used during the respective time interval.

The bitrate controller 80 also has an average bitrate calculator 84 configured to calculate an average normalised bitrate over the first time period as a function of the quantisation parameter used during the respective time interval, a quantisation parameter calculator 85 configured to calculate the new quantisation parameter based on a comparison of the average normalised bitrate and the allowable average bitrate, and a control output 86 configured to output the new quantisation parameter to the video encoder for encoding the video sequence during the second time period subsequent to the first time period.

The bitrate controller 80 may operate using the methods described above.

Figure 9:
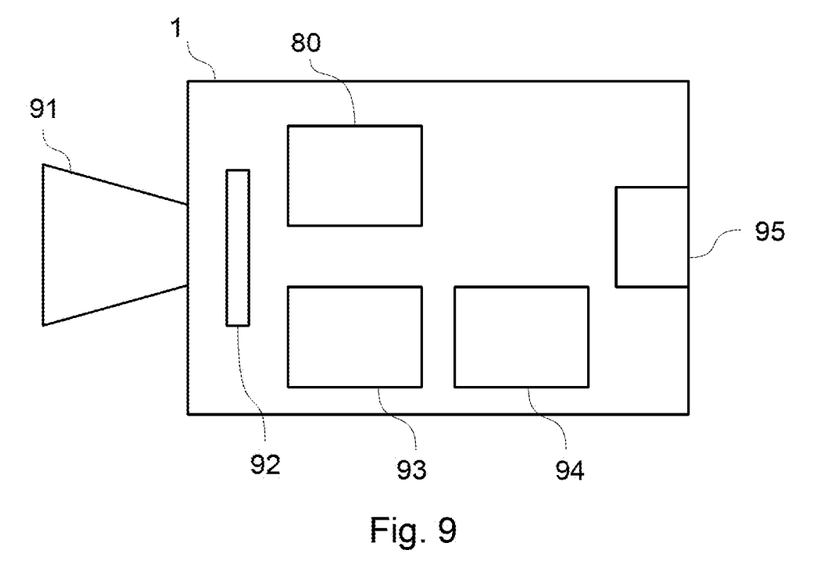
FIG. 9 is a block diagram of the camera in FIG. 1.

In FIG. 9, a simplified block diagram of the camera 1 is shown. The camera 1 has a lens 91, an image sensor 92, a bitrate controller 80, an encoder 93, a local storage 94, and a network interface 95. As will be appreciated by the skilled person, the camera 1 has additional components, but as these are not necessary for the explanation, they are not included in the drawings, and will not be further discussed. By means of the lens 91 and the image sensor 92, the camera 1 captures images of the scene 1. The images are encoded by the encoder 93 to form a stream of encoded image frames. The bitrate controller 80 controls the output bitrate of the encoder 93, as has been explained above. The local storage 94 may, e.g., be an SD card, and may be used for storing encoded image frames locally in the camera. By means of the network interface 95, the camera 1 may transmit encoded image frames to the network video recorder 21 and/or to the user station 23.

Figure 10:
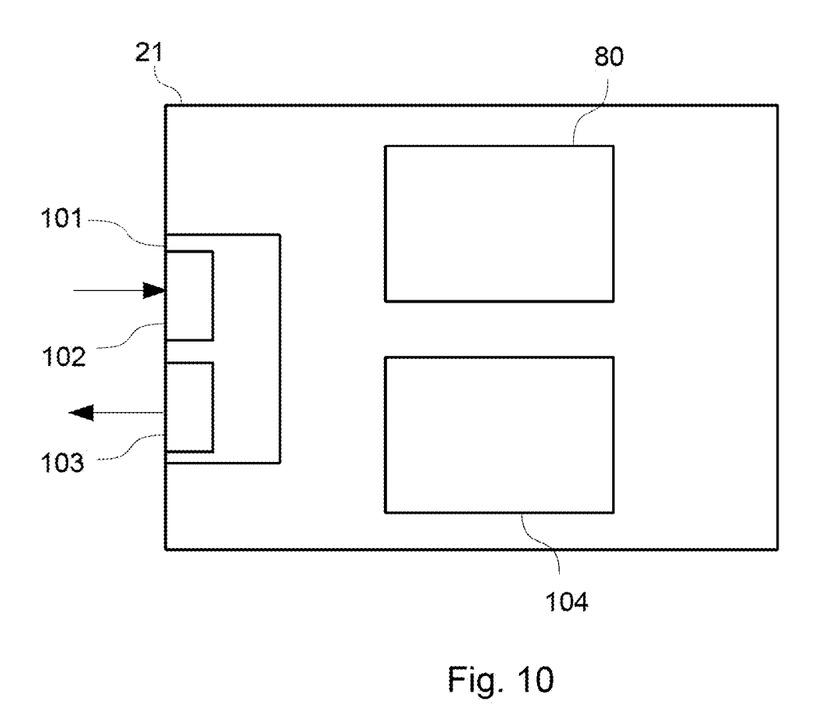
FIG. 10 is a block diagram of an embodiment of a network video recorder.

In FIG. 10 a simplified block diagram of the network video recorder 21 is shown. The network video recorder 21 has a network interface 101 with an input 102 for connection to the cameras 1 in the camera system 20, and an output 103 for connection to the user station 23. Further, the network video recorder 21 has a storage unit 104 and a bitrate controller 80. The storage unit 104 may, for instance, be a disk drive. The function of the bitrate controller 80 has been described in detail above. The network video recorder 21 may have other components as well, but as these are not necessary for explanation, they are not shown in the drawing and will not be further discussed. The bitrate controller 80 of the network video recorder 21 may control the encoder of one or more cameras connected to it. This may be particularly useful in a system of two or more cameras that need to share available bandwidth and storage capacity. If the bitrate controller of the network recorder controls encoding of the one or more cameras, there need not be a bitrate controller in the camera.

The method may be performed with the help of a computer program. The computer program may be stored on a non-transitory computer-readable storage medium, and it may comprise instructions adapted to carry out the method when executed by a device with processing capability.

The quantisation parameter may be the same in the entire image frame. It may however be advantageous to use different quantisation parameters in different parts or macroblocks of the image frame. For instance, macroblocks in the foreground or in parts of the image that are deemed relevant may be less compressed than macroblocks in the background or in parts of the image deemed not relevant. As mentioned in the summary, applicant's pending application EP-3 021 583 describes such an approach. If such varying quantisation parameters are used, the quantisation parameters used during the first time period, as well as the nominal quantisation parameter and the new quantisation parameter may each be a representative quantisation parameter which is representative of one or more quantisation parameters. For instance, the representative quantisation parameter may be a base quantisation parameter from which offsets are made, e.g. based on relevance of the macroblock to encode.

As examples above, offsets of the quantisation parameter of one or a few steps have been mentioned. It should be noted that it may be desirable to use smaller or larger offsets. It is possible to make offsets of less than one step, by offsetting, e.g., a chroma channel one step and leaving the luminance channel unaltered. Smaller steps than one are also possible by offsetting the quantisation parameter locally, for instance offsetting the quantisation by one step in the upper half of the image in one frame and with one step in the lower half in the next frame. It may also be noted that there are encoders that do not use QP steps as such, but to which the teachings are still equally applicable. For instance, AV1 uses lookup tables of quantization values.

It will be appreciated that a person skilled in the art can modify the above described embodiments in many ways and still use the advantages as shown in the embodiments above. As an example, the encoder need not be integrated in the camera, but could be a separate unit operatively connected to the camera.

The bitrate controller has been described as being integrated in a camera or a network video recorder, but it may as well be arranged as a separate unit and be operatively connected to a camera, a system of cameras, or a network video recorder.

Further, although the camera and the network video recorder have both been described as including a bitrate controller, it may be possible to dispense with it in either the camera or the network video recorder. If bitrate control is performed locally in each camera, it is not necessary to include a bitrate controller in the network video recorder. Analogously, it may not be necessary to have a bitrate controller in the camera if the bitrate control method is performed in the network video recorder. Similarly, if a separate bitrate controller is used, neither the camera nor the network video recorder need include a bitrate controller.

The images encoded by the encoder may be received directly from the capturing camera, or they may have been captured and stored earlier. Thus, the immediate source of the images may be an image sensor or a data file.

The camera may be any kind of camera, such as a camera employing visible light, a camera employing NIR (near infrared) radiation, or a thermal camera.

The camera is advantageously a digital camera, but it may instead be an analogue camera connected to a digitalisation unit.

The teachings have been described in the context of monitoring cameras, sometimes referred to as surveillance cameras, but it may be used to advantage also in other camera applications.

Although the camera system has been shown as including a network video recorder, it is entirely possible to arrange a camera system without a network video recorder. In such a system, storage may occur locally in the cameras and/or remotely, such as in a control centre.

The camera 1 shown in the drawings and discussed above includes a local storage 94. In some camera systems, the local storage may be the only storage, and in others it may be used for backup and redundancy, with storage also occurring in the network video recorder or on a storage device in or at the user station. For instance, servers may be arranged for storage in a control centre. In some camera systems, no local storage is included in the cameras, and only the network video recorder or other external storage is used.

Recording or storage of video may be performed continuously, but in many cases it is advantageous to store video only when triggered by an event, such as video motion detection or input from an alarm device, such as a PIR sensor. In this way, storage capacity may be saved by storing only potentially interesting video sequences and not storing video when nothing is happening in the scene.

Encoded image frames may be continuously transmitted to the user station, but also this may be limited by event triggering. In some video systems, encoded image frames may be continuously transmitted to a control centre, for storage and/or immediate viewing by an operator, and it may additionally be transmitted to a mobile device only based on event triggering, such that a user may be alerted when something happens in the scene.

The local storage in the camera may be used for so called fail-over recording. This means that if encoded image frames are normally continuously transmitted from the camera, local storing may commence if connection to the network is lost. Once network connection is restored, the video data stored in the local storage may be transmitted to the user station, and a complete video sequence may be restored.

The encoder may operate in accordance with any encoding standard employing motion estimation and motion compensation. The encoder may, for instance be a block-based hybrid encoder, such as an H.264 (AVC), H.265 (HEVC), VP9, or AV1 encoder.

The method may be performed by executing instructions stored on a computer-readable, non-transitory storage medium. The instructions may be executed by any device having processing capability, such as a central processing unit (CPU), a graphics processing unit (GPU), a custom made processing device implemented in an integrated circuit, an ASIC, an FPGA, or logical circuitry including discrete components.

In the description above, two examples of known bitrate increasing disturbance factors have been discussed. Other such disturbance factors can also be taken into account in the same. Additional examples of bitrate increasing disturbance factors are focus changes and moving overlays.

Although different embodiments and variants have been described above, they should not be seen as isolated, but the features thereof may be freely combined.

Thus, the description set forth herein should not be limited to the shown embodiments but should only be defined by the appended claims.

The invention claimed is:

1. A method of controlling output bitrate of a video encoder encoding a video sequence, the method comprising:
setting an allowable average bitrate,
gathering encoding data by encoding video during a first time period and for each time interval of a plurality of time intervals of the first time period, storing a respective output bitrate that was output during the time interval and a respective quantisation parameter used for encoding during the time interval,
for each time interval, normalising the output bitrate by calculating a corresponding normalised bitrate that is estimated based on a predetermined nominal quantisation parameter and as a function of the respective output bitrate and the respective quantisation parameter,
calculating an average normalised bitrate over the first time period by averaging the normalised bitrates of the plurality of time intervals,
calculating a new quantisation parameter based on a comparison of the average normalised bitrate and the allowable average bitrate, and
encoding the video sequence using the new quantisation parameter during a second time period subsequent to the first time period.

2. The method according to claim 1, further comprising:
comparing the average normalised bitrate to the allowable average bitrate,
upon the average normalised bitrate being above the allowable average bitrate calculating a new quantisation parameter which is higher than the nominal quantisation parameter, and
upon the average normalised bitrate being below or equal to the allowable average bitrate calculating a new quantisation parameter which is lower than or equal to the nominal quantisation parameter.

3. The method according to claim 2, further comprising:
upon the average normalised bitrate being above a maximum average bitrate, applying a maximum bitrate control, and
upon the average normalised bitrate being below or equal to the maximum average bitrate, applying a variable bitrate control.

4. The method according to claim 1, wherein gathering encoding data further comprises:
for each time interval, storing data on at least one known bitrate increasing disturbance factor.

5. The method according to claim 4, wherein the disturbance factor is a signal-to-noise ratio, SNR, of the video encoded during the respective time interval, the method further comprising:
upon the SNR being below a first SNR threshold, offsetting the quantisation parameter used during the time interval by an SNR offset value, such that a lower quantisation parameter is used for the respective time interval in calculating the average normalised bitrate.

6. The method according to claim 4, wherein the disturbance factor is a pan/tilt/zoom, PTZ, movement during the respective time interval, the method further comprising:
upon the PTZ movement being above a first PTZ threshold, offsetting the quantisation parameter used during the time interval by a PTZ offset value, such that a lower quantisation parameter is used for the respective time interval in calculating the average normalised bitrate.

7. The method according to claim 1, wherein the quantisation parameter, the nominal quantisation parameter, and the new quantisation parameter are each a representative quantisation parameter representative of one or more quantisation parameters.

8. The method according to claim 1, further comprising during the second time period:
gathering encoding data by encoding video during the second time period and for each time interval of a plurality of time intervals of the second time period, on a first-in-first-out basis, storing a respective output bitrate that was output during the time interval and a respective quantisation parameter used for encoding during the time interval.

9. The method according to claim 1, wherein the method is repeated at a plurality time points, and wherein the first time period corresponds to a sliding time window which for each time point covers a time range of fixed duration before that time point.

10. The method according to claim 1, wherein the normalised bitrate is calculated using a predetermined relation specifying how a change in quantisation parameter affects output bitrate.

11. The method according to claim 1, wherein the new quantisation parameter is calculated using a predetermined relation specifying how a change in quantisation parameter affects output bitrate.

12. A bitrate controller for controlling output bitrate of a video encoder encoding a video sequence, the bitrate controller comprising:
a bitrate presetter configured to set an allowable average bitrate, the bitrate presetter calculates the allowable average bitrate based on an available storage capacity,
a data storage configured to store encoding data from encoding video during a first time period, for each time interval of a plurality of time intervals of the first time period storing a respective output bitrate that was output during the time interval and a respective quantisation parameter used for encoding during the time interval,
an output bitrate normaliser configured to, for each time interval, normalise the output bitrate by calculating a corresponding normalized bitrate that is estimated based on a predetermined nominal quantisation parameter and as a function of the respective output bitrate and the respective quantisation parameter,
an average bitrate calculator configured to calculate an average normalised bitrate over the first time period as a function of the quantisation parameter used during the respective time interval, a quantisation parameter calculator configured to calculate a new quantisation parameter based on a comparison of the average normalised bitrate and the allowable average bitrate, and
a control output configured to output the new quantisation parameter to the video encoder for encoding the video sequence during a second time period subsequent to the first time period.

13. A computer program product comprising a non-transitory computer-readable storage medium with instructions adapted to carry out a method comprising:
setting an allowable average bitrate,
gathering encoding data by encoding video during a first time period and for each time interval of a plurality of time intervals of the first time period, storing a respective output bitrate that was output during the time interval and a respective quantisation parameter used for encoding during the time interval,
for each time interval, normalising the output bitrate by calculating a corresponding normalised bitrate that is estimated based on a predetermined nominal quantisation parameter and as a function of the respective output bitrate and the respective quantisation parameter,
calculating an average normalised bitrate over the first time period by averaging the normalised bitrates of the plurality of time intervals,
calculating a new quantisation parameter based on a comparison of the average normalised bitrate and the allowable average bitrate, and encoding the video sequence using the new quantisation parameter during a second time period subsequent to the first time period.

14. A camera comprising a bitrate controller for controlling output bitrate of a video encoder encoding a video sequence, the bitrate controller comprising:
a bitrate presetter configured to set an allowable average bitrate, the bitrate presetter calculates the allowable average bitrate based on an available storage capacity,
a data storage configured to store encoding data from encoding video during a first time period, for each time interval of a plurality of time intervals of the first time period storing a respective output bitrate that was output during the time interval and a respective quantisation parameter used for encoding during the time interval,
an output bitrate normaliser configured to, for each time interval, normalise the output bitrate by calculating a corresponding normalised bitrate that is estimated based on a predetermined nominal quantisation parameter and as a function of the respective output bitrate and the respective quantisation parameter,
an average bitrate calculator configured to calculate an average normalised bitrate over the first time period as a function of the quantisation parameter used during the respective time interval,
a quantisation parameter calculator configured to calculate a new quantisation parameter based on a comparison of the average normalised bitrate and the allowable average bitrate, and
a control output configured to output the new quantisation parameter to the video encoder for encoding the video sequence during a second time period subsequent to the first time period.

15. A network video recorder comprising a bitrate controller for controlling output bitrate of a video encoder encoding a video sequence, the bitrate controller comprising:
a bitrate presetter configured to set an allowable average bitrate, the bitrate presetter calculates the allowable average bitrate based on an available storage capacity,
a data storage configured to store encoding data from encoding video during a first time period, for each time interval of a plurality of time intervals of the first time period storing a respective output bitrate that was output during the time interval and a respective quantisation parameter used for encoding during the time interval,
an output bitrate normaliser configured to, for each time interval, normalise the output bitrate by calculating a corresponding normalised bitrate that is estimated based on a predetermined nominal quantisation parameter and as a function of the respective output bitrate and the respective quantisation parameter,
an average bitrate calculator configured to calculate an average normalised bitrate over the first time period as a function of the quantisation parameter used during the respective time interval,
a quantisation parameter calculator configured to calculate a new quantisation parameter based on a comparison of the average normalised bitrate and the allowable average bitrate, and
a control output configured to output the new quantisation parameter to the video encoder for encoding the video sequence during a second time period subsequent to the first time period.

* * * * *